March 19, 1929.　　O. P. PILE ET AL　　1,706,321
COUNTER DISPENSING DEVICE
Filed Nov. 24, 1928　　2 Sheets-Sheet 2
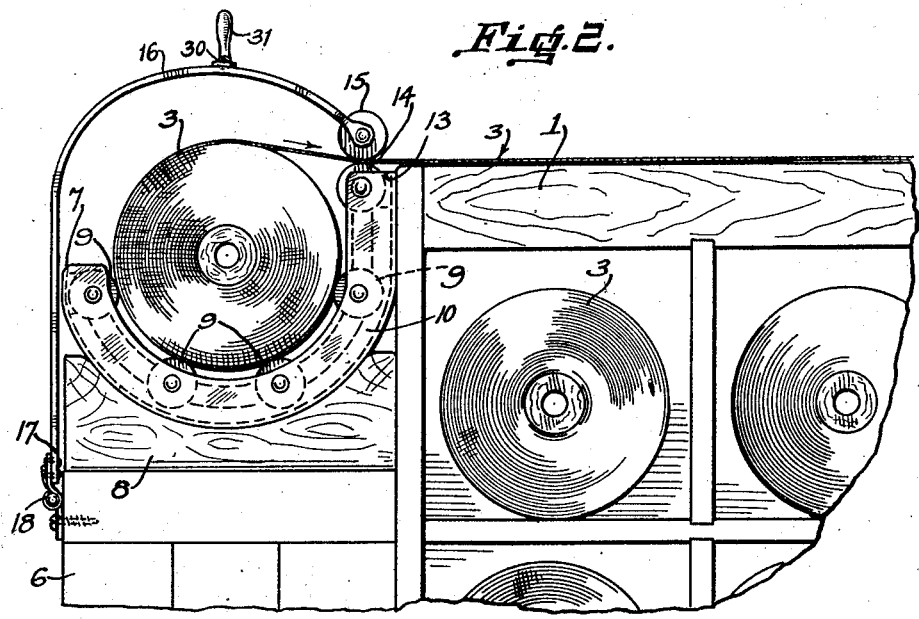
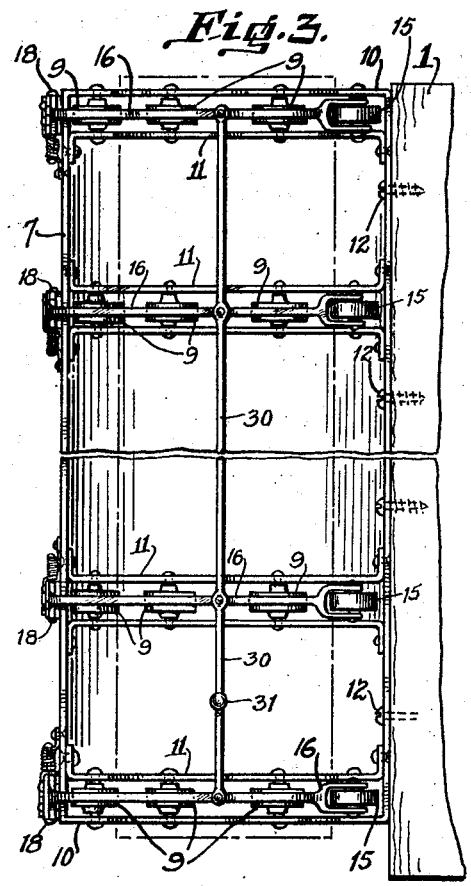
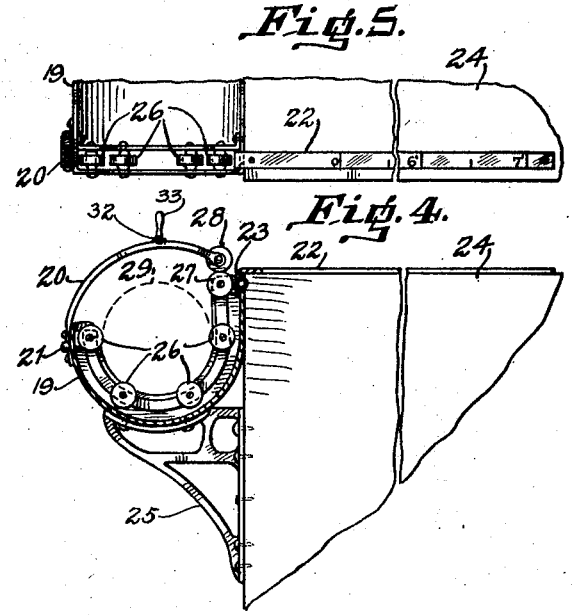
Inventors
O. P. Pile
and George W. Forgy
By Mason Fenwick&Lawrence
Attorneys Patented Mar. 19, 1929.

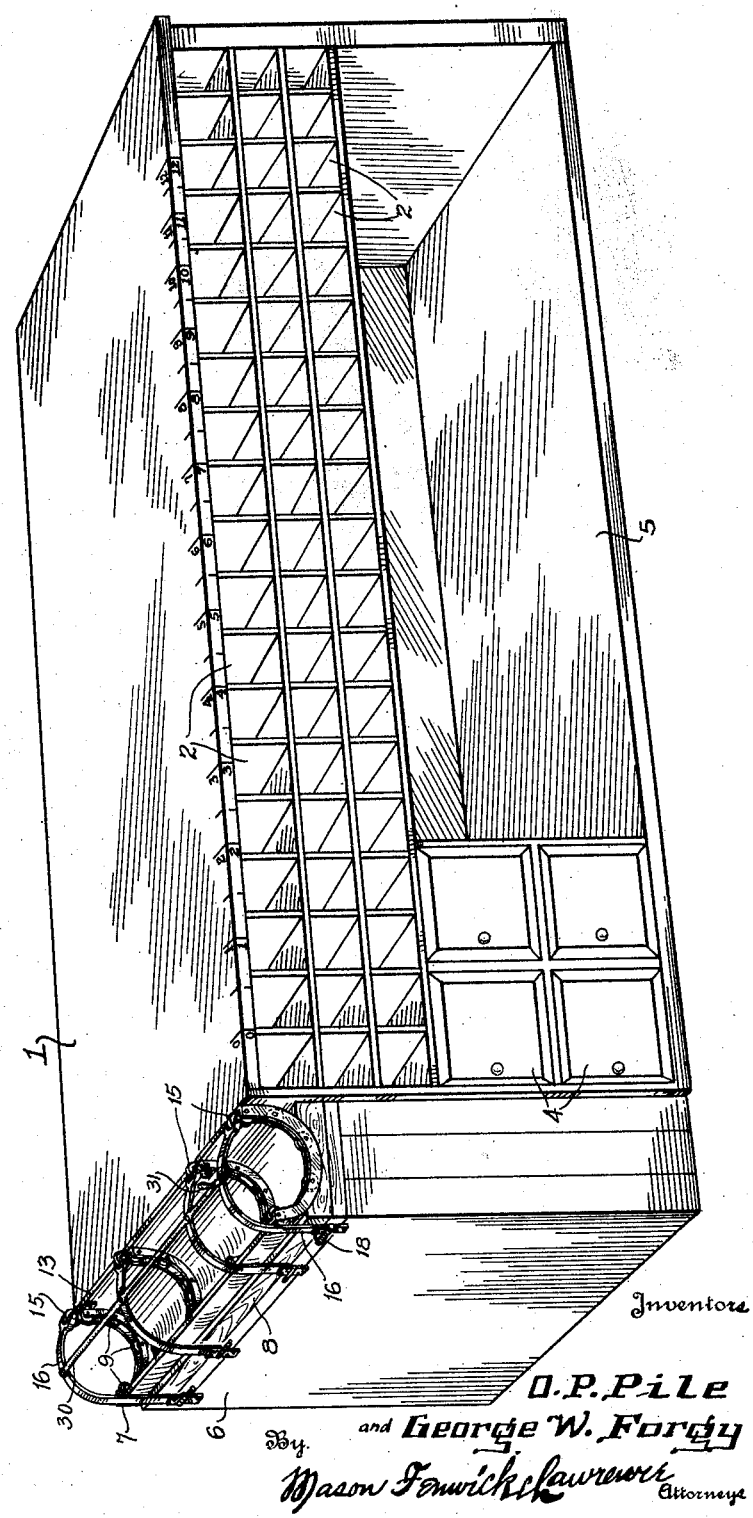

1,706,321

UNITED STATES PATENT OFFICE.

OTUS PROCTOR PILE AND GEORGE WARD FORGY, OF COWAN, TENNESSEE.

COUNTER DISPENSING DEVICE.

Application filed November 24, 1928. Serial No. 321,654.

This invention relates to improvements in counter dispensing devices, particularly in a device which may be readily combined with a suitably constructed counter of such a type, for instance, commonly used for the storing and measuring of screen wire and the like.

An object of this invention is to provide a dispensing device readily adapted for use in connection with a hardware counter having receptacles for storing and measuring merchandise such as screen wire, chicken wire, and the like. The rolls of wire may be stored loosely within suitable receptacles of the counter, and when a portion of the wire is sold, the wire is placed in a slot located at one end of the counter, and as the screen wire is rolled along the top of the counter, a graduated scale connected with the counter functions to measure the required length to be separated from the roll by means of shears or otherwise.

Another object of this invention is to provide a counter dispensing member which may be readily attached to a counter in such a manner that when a roll of screen cloth or the like is rotatively supported within the member, the screen cloth may be conveniently unrolled along the top of the counter, a required portion being severed from the roll of cloth by means of shears or otherwise, and at the same time means being provided for holding the free end of the roll in convenient and available position for the next operation.

A further object of this invention is to provide a counter dispensing member, comprising means therein for rotatably holding a roll of screen cloth or the like, measuring means and clamping means being connected to the member, the clamping means to hold the free end of the screen in available position, while the measuring means may be combined in a suitable manner with the counter top.

Other objects of this invention will appear from the following detailed description of the device, and as disclosed in the two sheets of drawings which are herewith made a part of this application.

In the drawings—

Figure 1 illustrates a perspective view of the counter dispensing device according to this invention.

Figure 2 represents an end elevational view of the counter dispensing device to an enlarged scale.

Figure 3 illustrates a top plan view of Figure 2.

Figure 4 represents an end elevational view of a modification of the counter dispensing device, according to this invention.

Figure 5 illustrates a portion of the top plan view of Figure 4.

As one modification of the counter dispensing device, according to this invention, it is preferred that numeral 1 designate a counter of a type particularly adapted for service in hardware stores and the like, having receptacles or pigeon holes 2, suitably constructed for the purpose of loosely receiving therein rolls 3, of wire cloth, wire screen, chicken wire, or the like.

The counter 1 may be made of any suitable material such as wood and formed having various storage spaces such as 4 and 5, one end of the counter being extended in the form of a supporting frame work 6, the upper edge of the frame 6 being located a suitable distance below the top surface of the counter 1 for the purpose of supporting a counter dispensing device comprising a trough shaped member 7, made of any proper material, and supported in the frame 6 of the counter by means of saddle portions 8.

The rollers 9 may be mounted within the trough 7 in any suitable manner, for instance, as disclosed in Figure 3, wherein the trough member 7 is formed having inwardly extending flange sections 10 at the ends thereof, inwardly extending bracket portions 11 securely fastened to the trough member 7, and suitably spaced from the flange members 10, in order to allow for the rotatable mounting of the rollers 9 therebetween, in such a manner that the wire roll 3 may freely ride and revolve upon the rollers 9 when a portion of the wire roll 3 is unrolled along the counter 1, as clearly disclosed in Figure 2.

The trough shaped member 7 may be securely fastened to the counter 1 by means of fastening elements 12, the upper or inner edge 13 of the trough 7 being located a suitable distance below the surface of the counter 1, so as to allow freedom in unrolling the wire roll along the counter. For the purpose of properly guiding the unrolling of the wire roll 3 and holding the free end always in available position, a roll member 14 is rotatably mounted at the upper, inner edges of the trough 7, and functions to cooperate with a clamping roll member 15, rotatably mounted upon a resilient member 16, made of spring wire or the like, having one end 17 suitably fastened as at 18 to a portion of the counter 6.

The figures of drawings 4 and 5 illustrate a modification of this invention wherein the counter dispensing member comprises a main trough shaped member 19, a clamping and guiding element 20 attached thereto, as at 21, and a measuring member 22 attached to the upper inner edge of the trough 19, as at 23, thereby forming a counter dispensing member which may be readily adapted and combined with a counter 24, the counter dispensing device being held in operative relationship with the counter by means of suitable fastening elements and a bracket 25; it being understood that the trough shaped element 19 is provided with the supporting rolls 26 and the guide roll 27, which functions to cooperate with the roll 28; the roll of wire screen 29, or otherwise, may be located within the trough 19 and unrolled between the rollers 27 and 28 along the counter 24, the amount of the wire cloth or screen required being measured off on the measuring element 22. In this modification, it is apparent that the counter dispensing member includes the measuring element 22.

It is to be understood that a plurality of roller members 9 and 15 may be positioned and spaced apart within the trough shaped member 7, as clearly disclosed in Figure 3, the inner series of guiding rollers 9 and clamping rolls 15 being adapted for use in connection with the shorter rolls of wire cloth 3, or the like. In order that all of the clamping roll members 15 and resilient arm members 16 may be raised simultaneously, it is preferred, in this invention, to connect the arm members 16 by means of a rod 30, a handle member 31 being adapted to extend therefrom for the purpose of convenient operation.

The modification of the invention disclosed in Figures 4 and 5, is likewise provided with a rod 32 for connecting the resilient arm members 20 together, the rod member 32 having projecting therefrom a handle element 33 for the convenient operation of raising the arm member and roller element 28.

In operation the counter dispensing device above described provides a convenient means for handling the sale of wire cloth and the like, commonly found in hardware stores. The rolls of wire screen are conveniently located within the receptacles for that purpose underneath the counter and may be readily placed when required within the trough shaped member at the end of the counter, and the proper amount unrolled and measured off by means of the measuring device connected with the counter and severed by shears or otherwise, the free end of the wire from the roll being held in available position for the next operation by means of guide rolls and clamping members.

It will be understood that many changes and modifications may be made in the form of embodiment of the invention within the scope of the following claims without departing from the spirit of the invention.

What we claim is:

1. A counter dispensing device comprising a main trough shaped member, inwardly extending flanges at the ends thereof, guide and supporting rollers rotatably mounted in the flanges for supporting merchandise to be dispensed on the counter, resilient clamping means arranged to cooperate with the guide rollers for holding the merchandise in accessible position.

2. A counter dispensing device comprising a main trough shaped member, inwardly extending flanges at the ends thereof, guide and supporting rollers rotatably mounted in the flanges for supporting merchandise to be dispensed on the counter, resilient clamping means arranged to cooperate with the guide rollers for holding the merchandise in accessible position, consisting of resilient members having rotatably mounted at the free ends thereof rollers for cooperating with the guide rollers and holding the merchandise there between.

In testimony whereof we affix our signatures.

OTUS PROCTOR PILE.
GEORGE WARD FORGY.